(12) United States Patent
Kanno et al.

(10) Patent No.: US 7,701,621 B2
(45) Date of Patent: Apr. 20, 2010

(54) IMAGE CORRECTION SYSTEM AND CORRECTING METHOD

(75) Inventors: Shigenori Kanno, Nagano (JP); Kazuo Nomura, Nagano (JP); Oh Jaekwan, Nagano (JP)

(73) Assignee: Seiko Epson Corporation, Tokyo (JP)

(*) Notice: Subject to any disclaimer, the term of this patent is extended or adjusted under 35 U.S.C. 154(b) by 1075 days.

(21) Appl. No.: 11/370,994

(22) Filed: Mar. 9, 2006

(65) Prior Publication Data
US 2006/0238828 A1  Oct. 26, 2006

(30) Foreign Application Priority Data
Mar. 10, 2005 (JP) ............................ P2005-066782

(51) Int. Cl.
H04N 1/00 (2006.01)
H04N 1/40 (2006.01)
H04N 1/04 (2006.01)
G03B 37/02 (2006.01)

(52) U.S. Cl. .................. 358/474; 358/404; 358/448; 396/20

(58) Field of Classification Search .............. 33/323, 33/329; 340/937; 352/53; 358/906, 909.1, 358/474, 473, 482, 483, 497; 396/20, 29; 382/312, 313, 321
See application file for complete search history.

(56) References Cited

U.S. PATENT DOCUMENTS 4,962,430 A * 10/1990 Hiroki et al. ............... 358/296
6,600,993 B1 * 7/2003 Kaneko et al. ............. 701/208

FOREIGN PATENT DOCUMENTS

JP  2001-268429 A  9/2001

* cited by examiner

Primary Examiner—Jerome Grant, II
(74) Attorney, Agent, or Firm—Sughrue Mion, PLLC

(57) ABSTRACT

An image correction system includes an image capturer, operable to capture an object image and to generate image data based on the object image, a first storage, adapted to store the image data, a timing signal generator, operable to periodically generate timing signals, an image processor, operable to periodically store the image data into the first storage in accordance with each of the timing signals, a detector, operable to periodically detect movement of the image capturer and to generate movement data based on the detected movement, and a second storage, adapted to periodically store the movement data in association with timing data based on each of the timing signals.

8 Claims, 8 Drawing Sheets

FIG. 5

| SAMPLE NO. | GYRO DATA | | VSYNC MARK DATA |
|---|---|---|---|
| | Y AXIS | Z AXIS | |
| 333 | 1539 | 1518 | 0 |
| 334 | 1546 | 1518 | 0 |
| 335 | 1554 | 1519 | 1 |
| 336 | 1558 | 1521 | 0 |
| 337 | 1560 | 1524 | 0 |
| 338 | 1559 | 1530 | 0 |
| 339 | 1560 | 1532 | 0 |
| 340 | 1556 | 1541 | 0 |
| 341 | 1551 | 1549 | 0 |
| 342 | 1545 | 1560 | 0 |
| 343 | 1537 | 1568 | 0 |
| 344 | 1530 | 1568 | 0 |
| 345 | 1523 | 1569 | 0 |
| 346 | 1518 | 1572 | 0 |
| 347 | 1521 | 1569 | 0 |
| 348 | 1527 | 1564 | 0 |
| 349 | 1530 | 1564 | 0 |
| 350 | 1535 | 1555 | 0 |
| 351 | 1536 | 1550 | 1 |
| 352 | 1536 | 1544 | 0 |
| 353 | 1537 | 1538 | 0 |
| 354 | 1538 | 1532 | 0 |
| 355 | 1538 | 1530 | 0 |
| 356 | 1540 | 1530 | 0 |
| 357 | 1544 | 1529 | 0 |
| 358 | 1547 | 1535 | 0 |
| 359 | 1550 | 1539 | 0 |
| 360 | 1553 | 1545 | 0 |
| 361 | 1553 | 1553 | 0 |
| 362 | 1550 | 1560 | 0 |
| 363 | 1547 | 1570 | 0 |
| 364 | 1540 | 1582 | 0 |
| 365 | 1533 | 1591 | 0 |
| 366 | 1522 | 1599 | 0 |

FIG. 8A
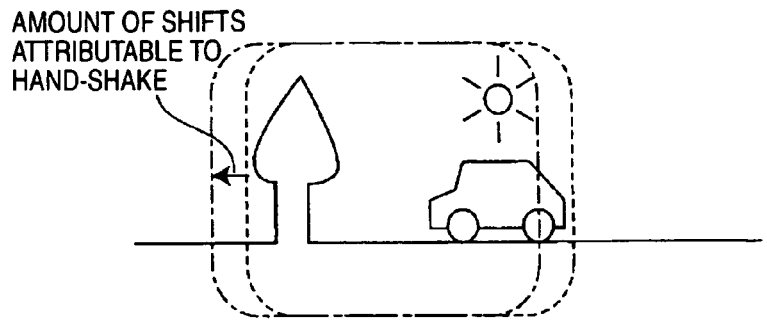
FIG. 8B CAPTURED FRAME IMAGE
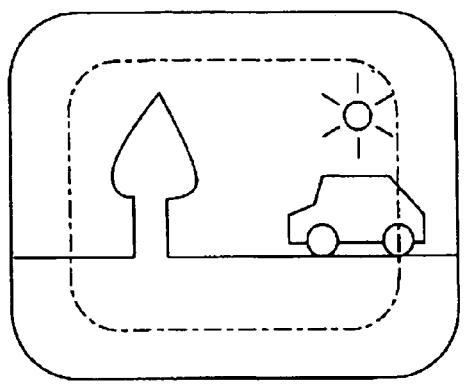
FIG. 8C SHIFT PICTURE FRAME
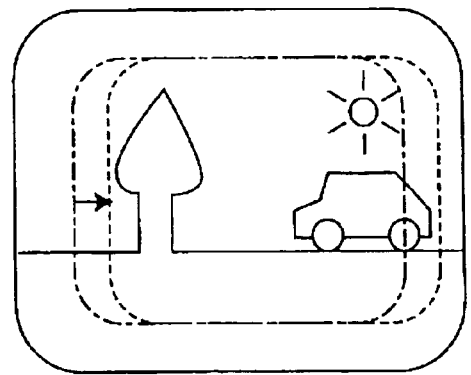
FIG. 8D CORRECTED FRAME IMAGE
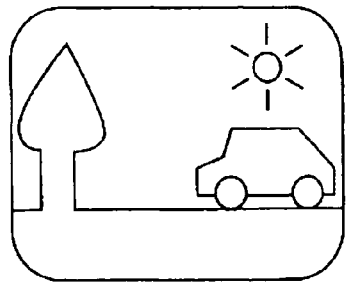

IMAGE CORRECTION SYSTEM AND CORRECTING METHOD

BACKGROUND OF THE INVENTION

The present invention relates to an image correction system including an image capturing device and a correcting method for image data.

JP-A-2001-268429 discloses an image capturing apparatus. This image capturing apparatus includes a hand-shake detection section for detecting hand-shake of the image capturing apparatus; a motion picture mode correction level computing section for computing the amount of correction on the movement of an image in the motion picture photographing mode on the basis of the hand-shake detected by the hand-shake detection section; and an image movement correction section for correcting movements of the image on the basis of the image movement correction level computed by the motion picture mode correction level computing section.

As described in JP-A-2001-268429, in relation to a motion picture, blurs in a picture attributable to hand-shake can be corrected on the basis of the hand-shake detected by the hand-shake detection section.

For instance, angular velocities detected by a gyro sensor or the like are stored in memory along with a plurality of continuously-captured frame images. The position of each of the frame images within a picture frame is moved in a direction to cancel the amount of deviation computed on the basis of the stored angular velocities. Thereby, hand-shake is considered to be canceled.

However, there may be a case where merely storing in memory data pertaining to angular velocities detected by the gyro sensor results in a failure to appropriately cancel the hand-shake arising during capture of a plurality of frame images. An example of such a failure will be described below.

When hand-shake, which has arisen between a first frame image and a second frame image immediately subsequent to the first frame image, are canceled, angular velocities, which have been detected during a time period in which two frame images are being captured, are subjected to integration. The second frame image is moved within the picture frame thereof by an amount corresponding to the integral value, to thus enable cancellation of hand-shake. Thereby, an object appearing in the first frame image and another object appearing in the second frame image can be aligned to essentially the same position within the picture frame.

However, when acquisition of angular velocity data performed by a gyro sensor and acquisition of a frame image are performed independently of each other, storing angular velocity data detected by the gyro sensor into memory is not sufficient to identify the nature of angular velocity data— among a plurality of pieces of angular velocity data stored in the memory—detected during a time period between the first frame image and the second frame image, making it difficult to accurately perform hand-shake correction.

Especially, when data pertaining to a frame image captured by an image capturing device are temporarily stored in a buffer, such as video memory, and when the data are captured at a predetermined frame rate from the buffer to predetermined memory, a delay arises between the former capturing timing and the latter capturing timing. Accordingly, the above-described problem becomes particularly noticeable.

SUMMARY

It is therefore an object of the invention to provide an image correction system capable of accurately performing hand-shake correction processing, and a hand-shake correction processing method.

In order to achieve the object, according to the invention, there is provided an image correction system comprising:

an image capturer, operable to capture an object image and to generate image data based on the object image;

a first storage, adapted to store the image data;

a timing signal generator, operable to periodically generate timing signals, an image processor, operable to periodically store the image data into the first storage in accordance with each of the timing signals;

a detector, operable to periodically detect movement of the image capturer and to generate movement data based on the detected movement; and a second storage, adapted to periodically store the movement data in association with timing data based on each of the timing signals.

The image correction system may further include a correction processor, operable to correct the image data corresponding to a first time period that is defined between a first one of the timing signals and a second one of the timing signals which is subsequent to the first one of the timing signals based on the movement data corresponding to a second time period that is defined between the first one of the timing signals and a third one of the timing signals which is followed by the first one of the timing signals.

The movement data corresponding to the second time period may indicate a shift amount included in the image data corresponding to the first time period, and in a case where the shift amount is no more than a predetermined amount, the image data corresponding to the first time period may not be corrected.

The image correction system may further includes a buffer memory, adapted to temporarily store the image data generated by the image capturer, the image processor may read out the image data from the buffer memory and store the image data into the first storage.

The first storage may store the image data in time-series order, the second storage may store the movement data and the timing data in the time-series order, the correction processor may read out the image data from the first storage and the movement data and the timing date from the second storage in the time-series order.

The movement data corresponding to the second time period may include a movement element being attributable to panning, and the correction processor may eliminate the movement element from the movement data corresponding to the second time period by filtering before correcting the image data corresponding to the first time period.

The detector may include a sensor for detecting the movement of the image capturer and a sampling unit for periodically sampling a value of the movement detected by the sensor.

The sensor may include a first gyro sensor detecting a first angular velocity of the image capturer around a first axis that is perpendicular to an optical axis of the image capturer and a second gyro sensor detecting a second angular velocity of the image capturer around a second axis that is perpendicular to the optical axis and the first axis.

In order to achieve the object, according to the invention, there is provided a correcting method comprising:

capturing an object image by a image capturer;
generating image data based on the object image;
periodically generating timing signals;
storing the image data into a first storage in accordance with each of the timing signals;
periodically detecting movement of the image capturer;
generating movement data based on the detected movement;
periodically storing the movement data in association with timing data based on each of the timing signals; and
correcting the image data corresponding to a first time period that is defined between a first one of the timing signals and a second one of the timing signals which is subsequent to the first one of the timing signals based on the movement data corresponding to a second time period that is defined between the first one of the timing signals and a third one of the timing signals which is followed by the first one of the timing signals.

BRIEF DESCRIPTION OF THE DRAWINGS

FIG. 5 is a descriptive view of a data structure of gyro log data saved in a storage device;

FIGS. 8A-D are descriptive views showing hand-shake correction processing performed by a hand-shake correction processing section.

DETAIL DESCRIPTION OF PREFERRED EMBODIMENTS

An image capturing apparatus and a hand-shake correction processing method, both pertaining to an embodiment of the present invention, will be described by reference to the drawings. The hand-shake correction processing method will be described as a part of operation of the image capturing apparatus.

Figure 1:
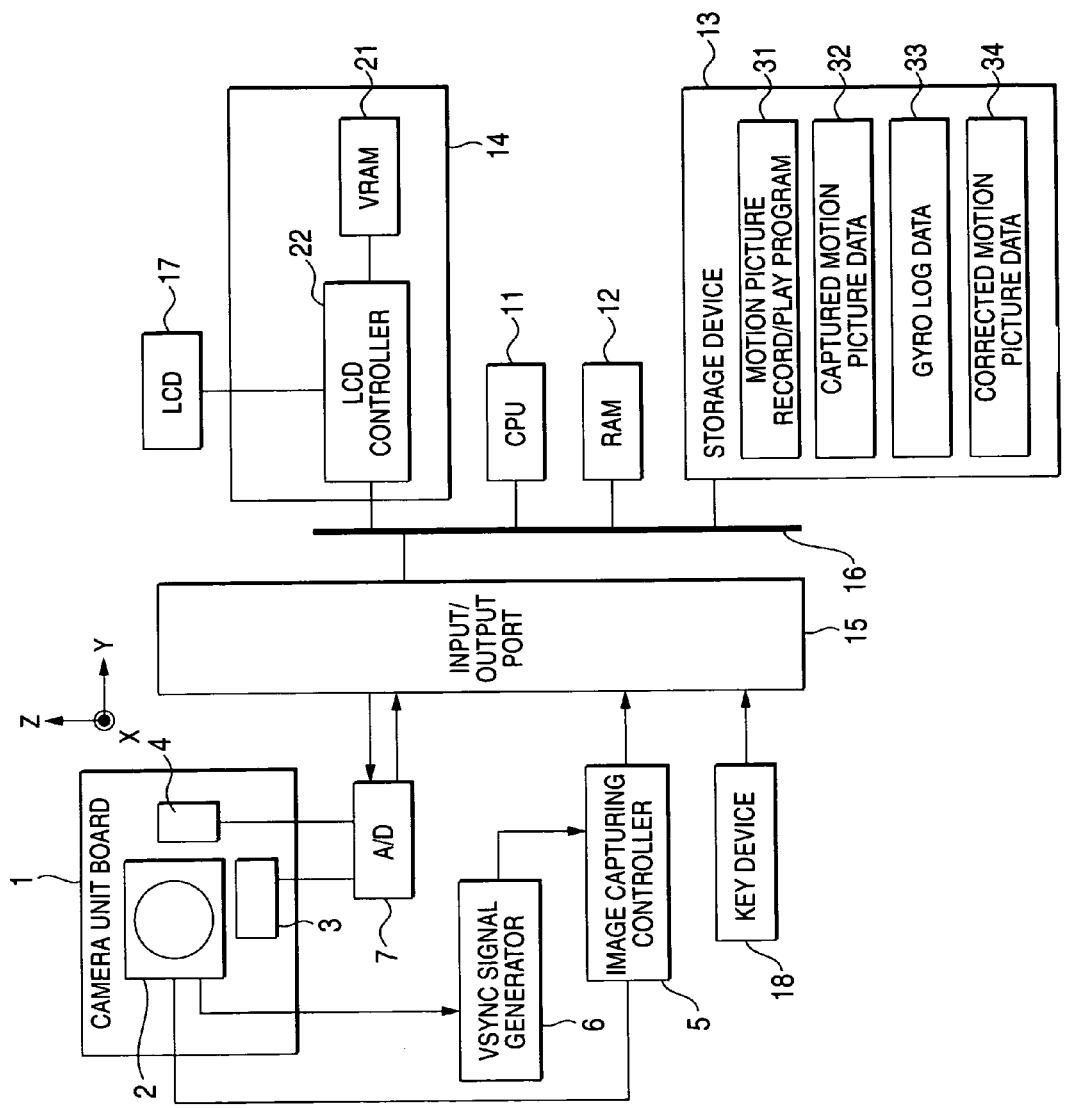
FIG. 1 is a block diagram showing the configuration of an image capturing apparatus according to an embodiment of the present invention.

FIG. 1 is a block diagram showing the configuration of an image capturing apparatus according to an embodiment of the present invention. This image capturing apparatus is a portable image capturing apparatus such as a portable cellular phone having a moving function or a video camera.

The image capturing apparatus has a camera unit board 1. An image capturing device 2, and gyro sensors 3, 4, which are portions of motion detection means, are mounted on the camera unit board 1. This camera unit board 1 is fixed in an unillustrated housing of the image capturing device 2.

The image capturing device 2 is a light-receiving device such as a CCD (Charge-Coupled Device) or CMOS (Complementary Metal-Oxide Semiconductor), and has a plurality of light-receiving elements. The plurality of light-receiving elements are two-dimensionally arranged on a plane perpendicular to an optical axis X of the image capturing device 2. In FIG. 1, two-dimensional arrangement directions of the plurality of light-receiving elements are indicated by the Y axis and the Z axis. An unillustrated optical-system unit is superposed on the image capturing device 2 in the direction of the X axis. The optical-system unit is formed from lenses, and an image of the object formed by incident light is projected onto the image capturing device 2.

Each of the light-receiving elements outputs a signal whose level is appropriate to the quantity of received light. When a reset signal is input to the light-receiving element, a level signal output from the light-receiving element is reset to a level in an initial state. The level signal output from the light-receiving element changes according to an increase in the quantity of light received after input of the reset signal.

An image capturing controller 5 is connected to the image capturing device 2. The image capturing controller 5 controls the image capturing device 2. Specifically, when an image is captured, the image capturing controller 5 outputs a reset signal at a predetermined number of lines. After lapse of a predetermined time period since the reset signal was output, the image capturing controller 5 reads level signals from a plurality of the light-receiving elements connected to lines from which the reset signal has been output. The image capturing controller 5 outputs a reset signal to all the lines, and generates image data pertaining to an image projected on the image capturing device 2 in accordance with the read level signals of a plurality of the light-receiving elements. The image capturing controller 5 outputs the generated image data as data pertaining to a single frame image.

The image capturing controller 5 is connected to a VSYNC (Vertical Synchronizing Signal: a vertical synchronizing signal) signal generator 6. The VSYNC signal generator 6 outputs a VSYNC signal as a timing signal at a predetermined frequency; e.g., every one-thirtieth second. In accordance with the VSYNC signal, the image capturing controller 5 commences image pickup operation to be performed by the image capturing device 2. The image capturing controller 5 samples a VSYNC signal output by the VSYNC signal generator 6.

Each of the gyro sensors 3, 4 detects an angular velocity in one predetermined direction. Such gyro sensors 3, 4 include, e.g., a vibration gyro sensor "XV-3500CB" developed by the present inventors. By way of example, an outer dimension of this vibration gyro sensor XV-3500CB measures 5.0 (mm)× 3.2 (mm)×1.3 (mm), and the mass of the vibration gyro sensor is 66 (mg). Using such a compact, low-profile vibration gyro sensor enables installation of a sensor in an image capturing apparatus having a housing whose internal space is narrow.

The gyro sensor 3 detects an angular velocity stemming from orbital movement around the Z axis in FIG. 1. The gyro sensor 4 detects an angular velocity stemming from orbital movement around the Y axis in FIG. 1. Consequently, the gyro sensors 3, 4 detect the movement of the image capturing device 2 about the Y axis and the movement of the same about the Z axis.

An A/D (analog-to-digital) converter 7 samples level signals of the angular velocities detected by the gyro sensors 3, 4, and outputs digital data having sampled values. The A/D converter 7 samples the level signals output from the gyro sensors 3, 4 at a time period of, e.g., one-sixteenth of the period of the VSYNC signal output from the VSYNC signal generator 6. The image capturing controller 5 samples the VSYNC signal output from the VSYNC signal generator 6. In the present embodiment, the digital data output from the A/D converter 7 are called gyro data.

This image capturing apparatus is additionally connected to a central processing unit (CPU) 11, RAM (Random Access Memory) 12, a storage device 13, a video board 14, an input/ output port 15, and a system bus 16 interconnecting these elements. The video board 14 is connected to a liquid-crystal (LCD) monitor 17.

The video board 14 includes VRAM (Video Random Access Memory) 21, and an LCD controller 22. The VRAM 21 stores display data.

The LCD controller 22 reads out the display data stored in the VRAM 21, generates a display signal corresponding to the read display data, and outputs the thus-generated display signal to the LCD 17. In accordance with the display signal, the LCD 17 displays an image on the display section.

The LCD controller 22 manages writing and reading of data into and from the VRAM 21. When a data write request are received from the system bus 16 and display processing is to be performed, the LCD controller 22 sequentially performs these processing operations. Access to the VRAM 21 is exclusively managed.

The gyro sensors 3, 4, the A/D converter 7, the image capturing controller 5, the VSYNC signal generator 6, and a key device 18 are connected to the input/output port 15. The A/D converter 7 outputs gyro log data to the input/output port 15. The image capturing controller 5 outputs data pertaining to a frame image to the input/output port 15. The key device 18 outputs, to the input/output port 15, input data appropriate to an actuated key. The key device 18 has, e.g., a start button, a record start button, a play button, and the like, all of which are unillustrated.

The storage device 13 stores a motion picture record/play program 31, captured motion picture data 32, gyro log data 33, and corrected motion picture data 34. The storage device 31 can be formed from, e.g., any of various types of semiconductor memory devices such as flash memory or an HDD (Hard Disk Drive).

The motion picture recording/play program 31 may be stored in the storage device 13 before shipping of an image capturing apparatus or after shipment of the same. When the motion picture record/play program 31 is stored in the storage device 13 after shipment of the image capturing apparatus, the only requirement to store the motion picture record/play program 31 in the storage device 13 is to install the program stored in a recording medium, such as CD-ROM (Compact Disc Read Only Memory), or the program downloaded by way of a communications medium such as a phone line or the Internet.

Figure 2:
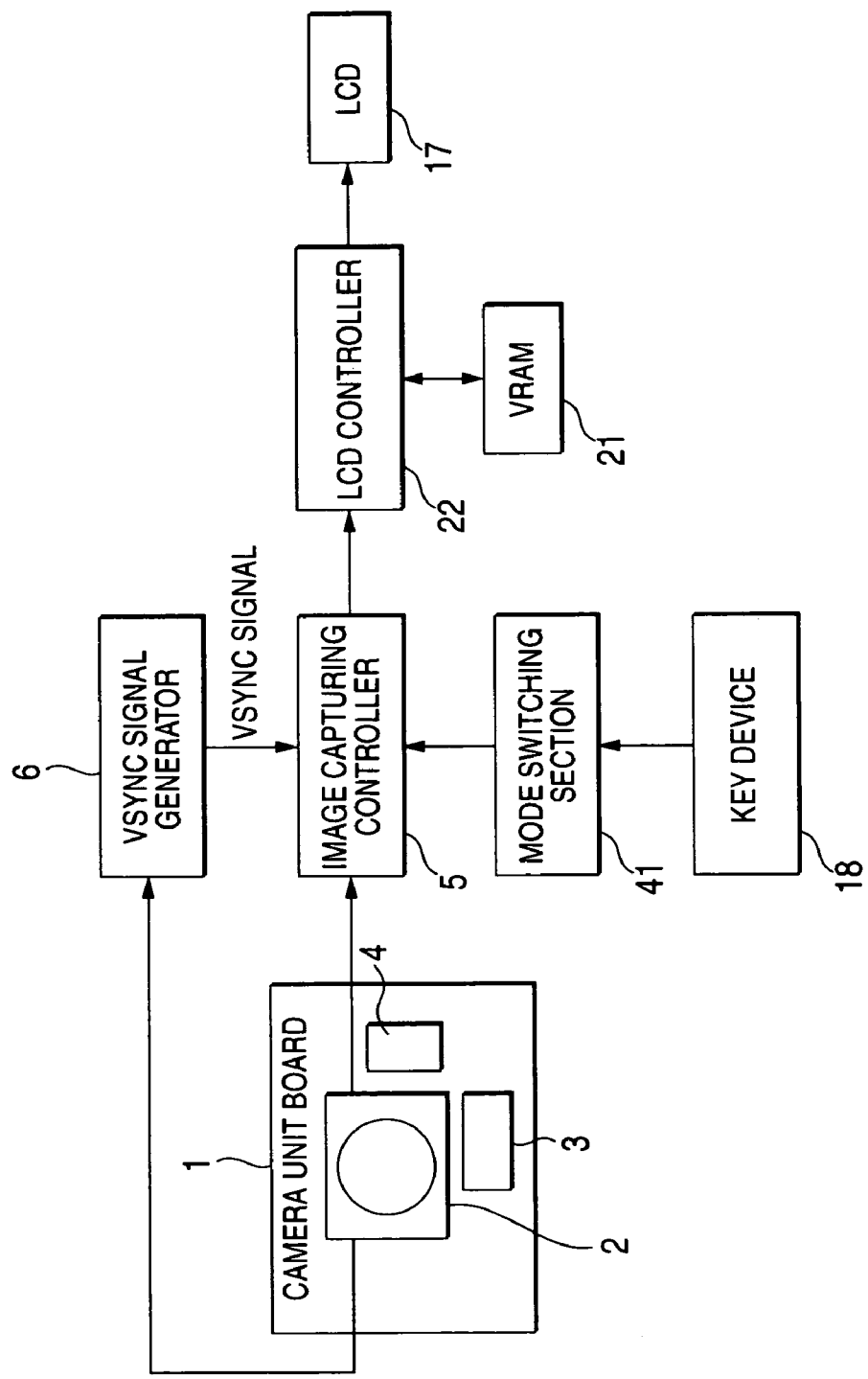
FIG. 2 is a block diagram showing a function implemented at start-up of a motion picture record/play program.
Figure 3:
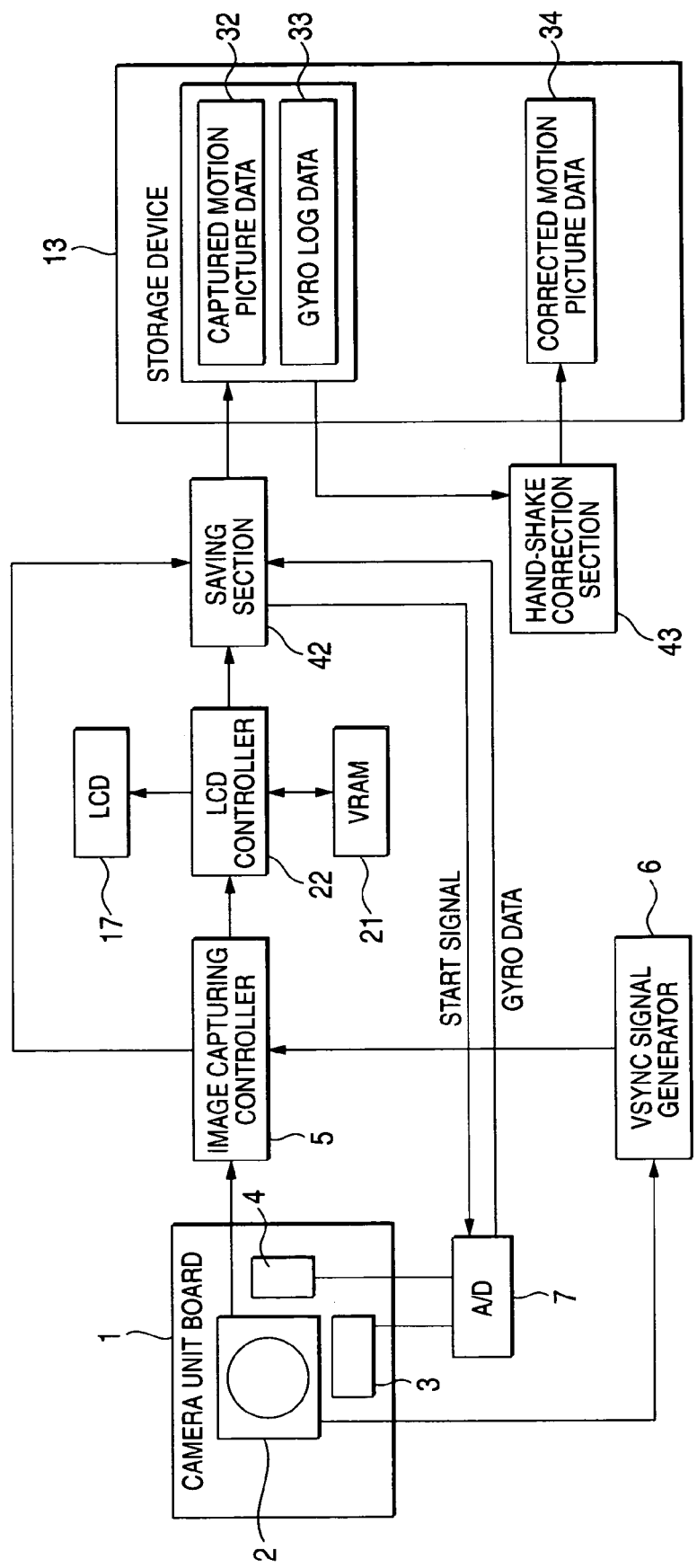
FIG. 3 is a block diagram showing a function implemented during an image capturing mode.
Figure 4:
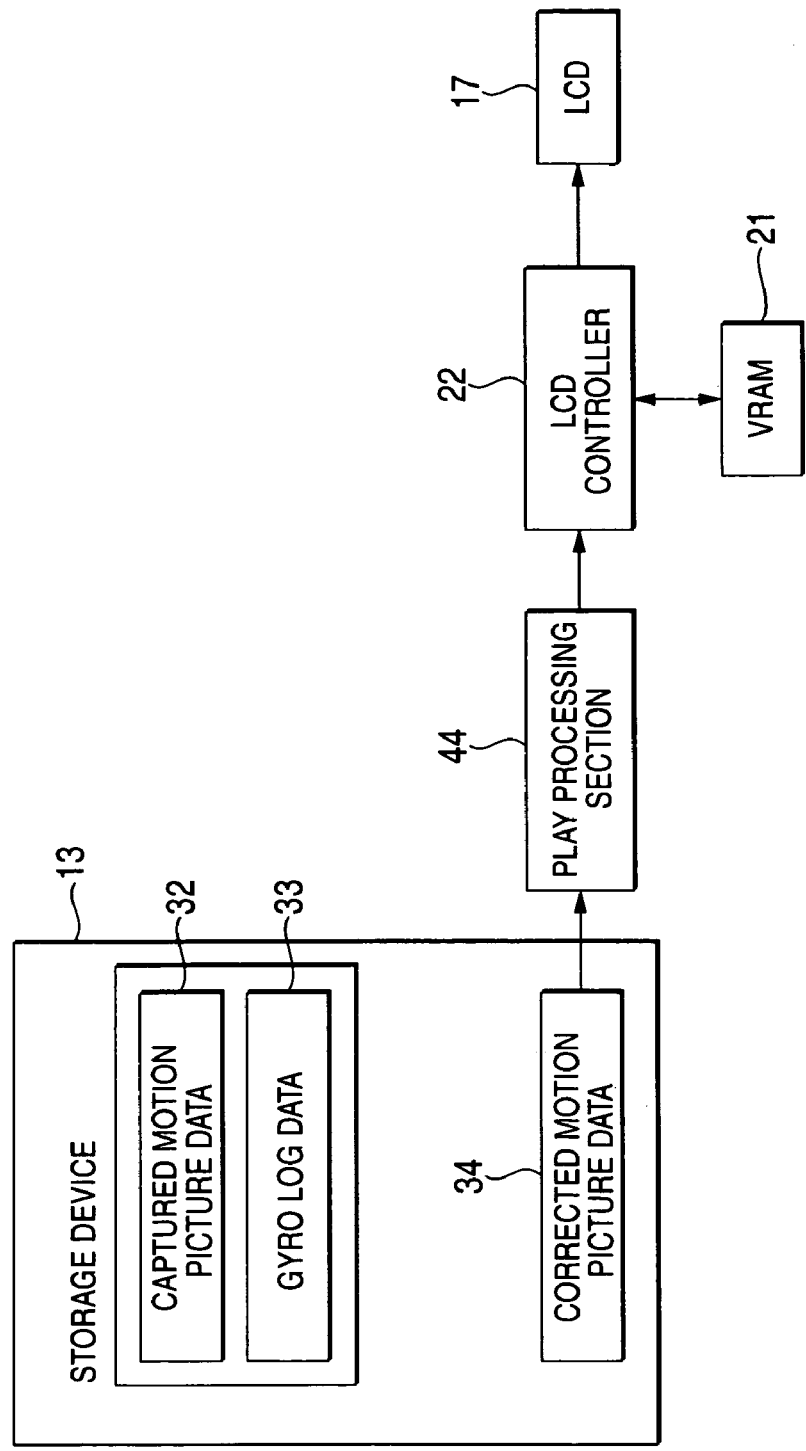
FIG. 4 is a block diagram showing a function implemented during a play mode.

FIG. 2 is a block diagram showing the function implemented by the image capturing apparatus shown in FIG. 1, at start-up of the motion picture record/play program 31. FIG. 3 is a block diagram showing the function implemented in the image capturing apparatus shown in FIG. 1 during an image capturing mode. FIG. 4 is a block diagram showing the function implemented in the image capturing apparatus shown in FIG. 1 during a play mode.

A mode switching section 41 shown in FIG. 2 switches the operation mode of the image capturing apparatus between an image capturing mode and a play mode. The image capturing mode is a mode in which a motion picture is acquired and the captured motion picture data 32, the gyro log data 33, and the corrected motion picture data 34 are stored in the storage device 13. The play mode is a mode for displaying, on the LCD 17, the motion picture based on the corrected motion picture data 34 stored in the storage device 13.

A saving section 42 shown in FIG. 3 stores the gyro data input to the input/output port 15 and data showing presence/ absence of the VSYNC signal sampled by the image capturing controller 5, in an associated manner as the gyro log data 33 into the storage device 13. The saving section 42 adds the data read at certain timings as a single record to the gyro log data 33.

FIG. 5 is a descriptive view showing an example of data structure of the gyro log data 33 to be stored in the storage device 13 in FIG. 1. In FIG. 5, each line corresponds to a single record at a certain timing. One record is formed from a sample number, gyro data pertaining to the Y axis, gyro data pertaining to the Z axis, and VSYNC mark data.

The sample number is a numeral which is incremented by one every time there is performed processing for reading the gyro data and the VSYNC signal, which are input to the input/output port 15. In relation to the VSYNC mark data, when the VSYNC signal is detected as a predetermined non-zero value, numeral "1" is recorded. When the VSYNC mark data are detected as zero, numeral "0" is recorded. In FIG. 5, the VSYNC mark data value assumes "1" every 16 records.

In the gyro log data 33 shown in FIG. 5, a plurality of records are added in sequence from top to bottom and in time sequence. A record to be newly recorded is added to the tail end (the lowest position in FIG. 5) of the gyro log data 33.

The saving section 42 shown in FIG. 3 reads the display data stored in VRAM 21 at a predetermined frame rate, and saves the thus-read display data as the captured motion picture data 32 into the storage device 13. Operation of the saving section 42 does not particularly need to be synchronized with the VSYNC signal output from the VSYNC signal generator 6 of the camera. The saving section 42 adds the display data read from the VRAM 21 as a single frame image into the captured motion picture data 32.

A hand-shake correction processing section 43 shown in FIG. 3 subjects the captured motion picture data 32 in the storage device 13 to predetermined hand-shake correction processing through use of the gyro log data 33 in the storage device 13. The hand-shake correction processing section 43 saves the captured motion picture data 32, which have undergone predetermined hand-shake correction processing, as the corrected motion picture data 34 in the storage device 13.

A play processing section 44 in FIG. 4 reads the corrected motion picture data 34 stored in the storage device 13. The play processing section 44 generates display data and writes the thus-generated display data into the VRAM 21 by way of the LCD controller 22.

Operation of the image capturing apparatus, which has the above-described configuration and is shown in FIG. 1, will now be described. In the following description, the image capturing mode will first be described, and then the play mode will be described.

When the start button of the key device 18 shown in FIG. 1 is actuated, the key device 18 outputs input data corresponding to the start button. The input data are supplied to the central processing unit 11 by way of the input/output port 15 and the system bus 16, both of which are shown in FIG. 1. The central processing unit 11 reads the motion picture record/ play program 31 from the storage device 13, and executes the program. Thus, the mode switching section 41 is implemented as shown in FIG. 2.

In this state, the image capturing controller 5 causes the image capturing device 2 to operate every time period of the VSYNC signal to thus generate frame image data and output the data to the input/output port 15. The frame image data are supplied to the video board 14 by way of the system bus 16. The LCD controller 22 of the video board 14 writes the frame image data supplied from the system bus 16 into the VRAM 21.

Thereby, the VRAM 21 stores, as display data, data pertaining to the frame image captured by the image capturing device 2. The frame image data stored in the VRAM 21 are updated every time period of the VSYNC signal.

The LCD controller 22 periodically reads the display data from the VRAM 21. The only requirement for the time period at which the LCD controller 22 reads the display data is to become identical with the time period at which the VSYNC signal generator 6 generates a VSYNC signal. The LCD controller 22 generates a display signal corresponding to the read display data, and outputs the thus-generated display signal to the LCD 17. In accordance with the display signal, the LCD 17 displays a frame image on the display section. Through a round of the above-described processing operations, the LCD 17 displays the image captured by the image capturing device 2 as a motion picture in real time.

During processing for displaying the image captured by the image capturing device 2 on the LCD 17 in real time, the LCD controller 22 sequentially performs processing for writing the frame image data into the VRAM 21 and processing for reading display data.

In this state, when the record start button of the key device 18 shown in FIG. 1 is actuated, the key device 18 outputs input data corresponding to the record start button. In accordance with supply of input data, the mode switching section 41 sets the operation mode of the image capturing apparatus to an image capturing mode. As shown in FIG. 3, the saving section 42 and the hand-shake correction processing section 43 are realized in the image capturing apparatus shown in FIG. 1.

Figure 6:
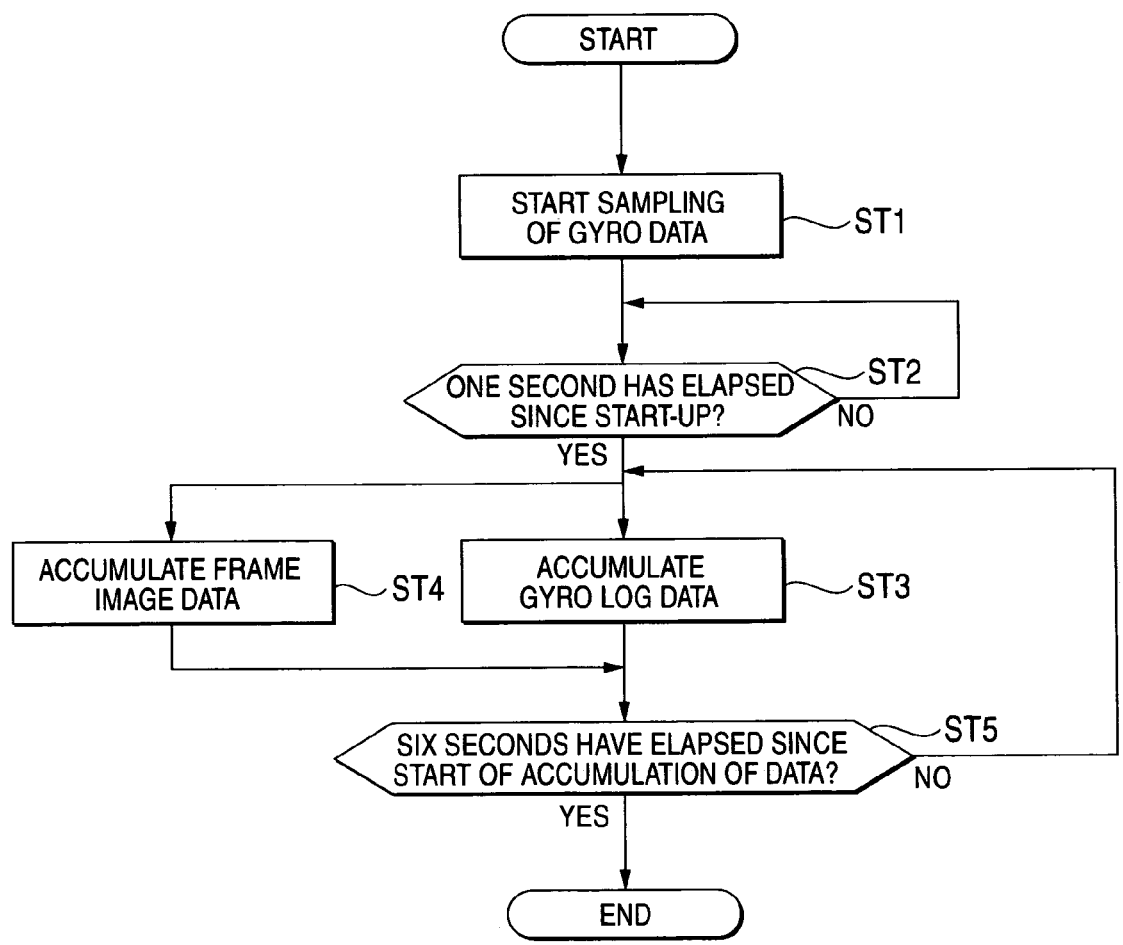
FIG. 6 is a flowchart showing operation of a saving section.

FIG. 6 is a flowchart showing operation of the saving section 42 shown in FIG. 3. The saving section 42 first outputs a start signal to the A/D converter 7 (step ST1). The A/D converter 7 starts detection of an angular velocity. Consumption of hundreds of milliseconds is required before the output levels of the gyro sensors 3, 4 become stable after having gone through a transient state, for reasons of such as pressing of a button performed by the user or an initial varying state of the circuit. The saving section 42 determines whether or not one second or thereabouts has elapsed since the start signal has been output (step ST2). When one second has elapsed, saving operation is started. The saving section 42 starts saving operation for recording a motion picture of, e.g., six seconds.

When saving of a motion picture has been started, the saving section 42 reads the gyro data from the input/output port 15 and data showing presence/absence of the VSYNC signal sampled by the image capturing controller 5. The thus-read data are added, in an associated manner, to the gyro log data 33 in the storage device 13 (step ST3).

Alternatively, the saving section 42 reads the display data stored in the VRAM 21 and writes the thus-read display data into the storage device 13. The saving section 42 adds the thus-read display data as image data pertaining to one frame, to the captured motion picture data 32 (step ST4)

Figure 7:
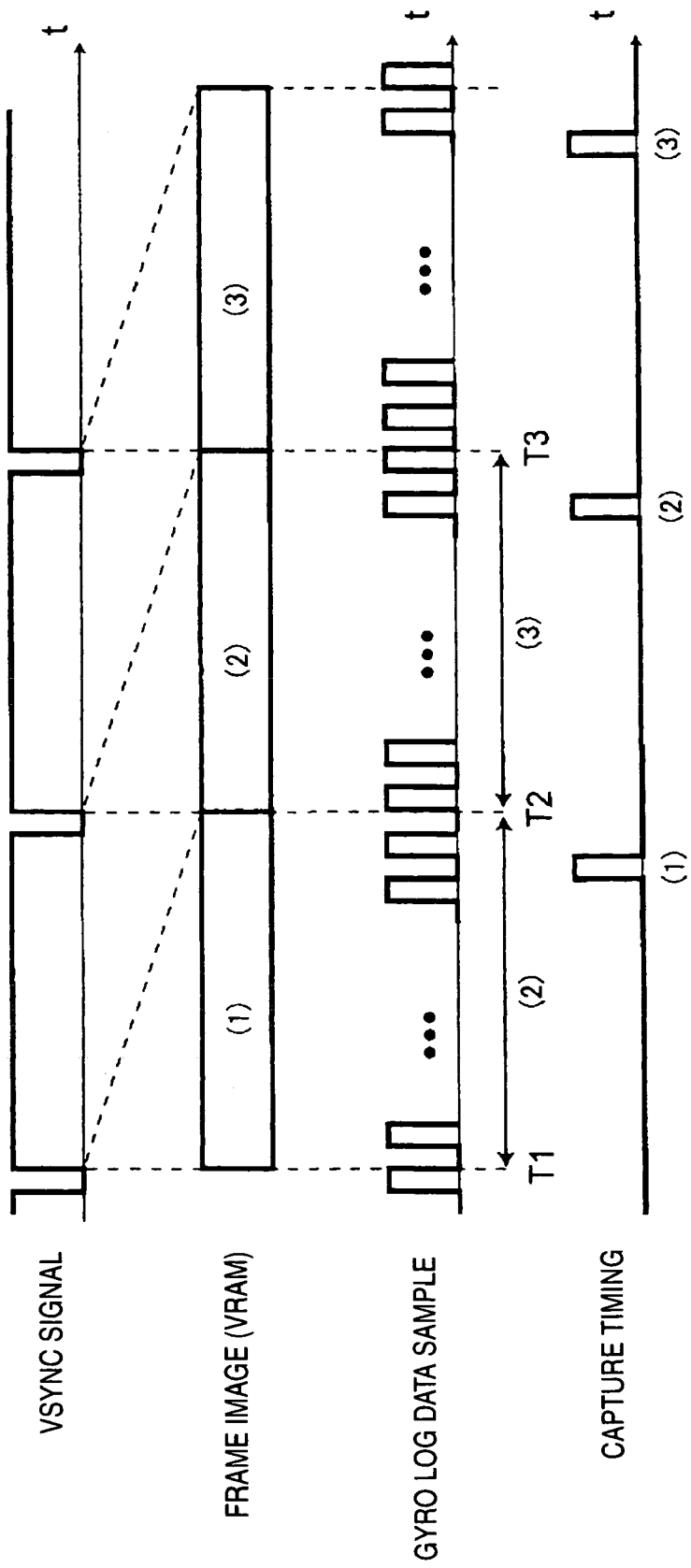
FIG. 7 is a view showing a correspondence between the gyro log data and a frame image.

FIG. 7 shows a view showing correspondence between the gyro log data sample of the present embodiment and frame image data captured by the storage device 13.

As shown in FIG. 7, the frame image is captured in synchronism with the VSYNC signal output from the VSYNC signal generator 6, and frame image data pertaining to the frame image are stored in the VRAM 21. In the present embodiment, the frame image data pertaining to the first frame image are stored in the VRAM 21 during a time period from image capturing timing T1 of the first frame image to image capturing timing T2 of the second frame image. The saving section 42 captures the frame image data from the VRAM 21 at any time during the time period, and adds the thus-captured frame image data to captured motion picture data 32 in the storage device 13.

Consequently, for instance, the image data pertaining to the second frame image are captured from the VRAM 21 at any timing during a time period from time T2 to time T3. The captured image data pertaining to the second frame image are associated with the gyro log data sample captured from the image capturing timing T1 of the first frame image to the image capturing timing T2 of the second frame image. In short, at the timing when the frame image data have been captured from the VRAM 21, the captured frame image data are associated with a record ranging from a record next to the first record—where the value of the VSYNC mark data assumes a value of 1—when viewed from the latest record (the final record) of the gyro log data 33, to the next record where the VSYNC mark data assume a value of one.

After six seconds have passed since the start of processing for saving motion pictures, the saving section 42 determines whether or not frame image data for 90 frames and gyro log data have been acquired (step ST5).

When six seconds have not yet elapsed since the start of processing for saving motion pictures, the saving section 42 returns processing to step ST3, ST4, where processing for saving gyro log data and frame image data is repeated.

When six seconds have elapsed since the start of processing for saving motion pictures, the saving section 42 terminates processing for saving motion pictures. Thereby, at the end of processing for saving motion pictures, the gyro log data 33, as illustrated in FIG. 5, and the captured motion picture data 32 formed from a plurality of pieces of frame image data are stored in the storage device 13.

When motion pictures of six seconds are recorded, the number of records of the gyro log data 33 assumes a value of 1440 (6×15×16). The number of pieces of VSYNC mark data, each of which assumes a value of one, takes on 90 (=6×15).

A plurality of the frame images consecutively generated by the image capturing controller 5 are included in the captured motion picture data 32 in the sequence of capture. When motion pictures for six seconds are recorded, the number of frame images of the captured motion picture data 32 takes on 90 (=6×15).

After processing for saving motion pictures performed by the saving section 42 has been completed, the hand-shake correction processing section 43 generates the corrected motion picture data 34 from the captured motion picture data 32 and the gyro log data 33, which are stored in the storage device 13, and saves the thus-generated corrected motion picture data 34 into the storage device 13.

Specifically, the hand-shake correction processing section 43 subjects the respective frame images of the corrected motion picture data 34 to processing for correcting shifts, which are attributable to hand-shake and are included in the frame images.

During correction processing for correcting shifts, which are included in the first frame image and attributable to hand-shake, the hand-shake correction processing section 43 first retrieves a record from the head of the gyro log data 33, to thus specify the first record where the VSYNC mark data assumes a value of one. In FIG. 5, the third record from the top is the first record where the VSYNC mark data assume a value of one.

After having specified the first record where the VSYNC mark data assume a value of one, the hand-shake correction processing section 43 computes the amount of shifts in the frame image by use of records up to the record from the head of the gyro log data 33 which is specified for each of the Y axis and the Z axis.

After the amount of shifts in the records up to the specified record have been computed, the hand-shake correction processing section 43 moves the picture frame in the frame image so as to cancel the shift, extracts data pertaining to an image in the picture frame, and takes the thus-extracted data as corrected image data.

FIG. 8 is a descriptive view showing hand-shake correction processing to be performed by the hand-shake correction processing section 43 shown in FIG. 3. FIG. 8A shows an image capturing scene. FIG. 8B shows a captured frame image. FIG. 8C shows a frame image obtained after hand-shake correction processing. FIG. 8D shows a frame image finally generated through hand-shake correction processing. In FIG. 8A, a square frame made up of a dotted line shows an image capturing range achieved at timing when saving processing performed by the saving processing section 42 is started. In FIG. 8A, a square frame made up of a dashed line shows an image capturing range achieved at timing when the frame image shown in FIG. 8B is captured.

In FIG. 8A, the image capturing range (the frame made up of a dashed line) achieved at timing when a frame image in FIG. 8B is achieved is shifted leftward on the sheet in relation to the image capturing range (the frame made up of a dotted line) achieved at timing when the saving section 42 has started saving operation. The hand-shake correction processing section 43 computes the amount of shifts on the basis of the gyro log data 33. As shown in FIG. 8C, the picture frame is moved rightward in the sheet within the frame image by the amount corresponding to the shifts.

By means of the hand-shake correction processing, the position of an object (e.g., an automobile) within the frame coincides with the position of the object in the image capturing range achieved at timing when the saving section 42 commences saving operation, to thus cancel the shifts attributable to hand-shake.

In the foregoing description, the hand-shake correction section 43 moves the frame image within the frame so as to cancel the amount of shifts which have arisen in the records up to the record specified on the basis of the gyro log data 33.

In reality, the hand-shake correction processing section 43 divides the amount of shifts having arisen in the records up to the record specified by the gyro log data 33, into the amount of shifts attributable to hand-shake and the amount of shifts attributable to panning, whereby only the amount of shifts attributable to hand-shake are canceled. Such dividing operation is implemented by filtering operation where classification is performed in accordance with the amplitude or frequency of blurs.

Panning is a manner of image capturing an object while the image capturing apparatus is moved in essentially a single direction at essential uniform speed during image capturing operation. Consequently, the amount of shifts in pan are included in the gyro data as movement elements which contribute to moving the image capturing apparatus in an essentially fixed direction. Therefore, in order to divide the shifts into the amount of shifts attributable to hand-shake and the amount of shifts attributable to panning, the hand-shake correction processing section 43 determines whether or not movement elements in an essentially fixed direction are included in the gyro data pertaining to the respective axes from the head to the end thereof, on the basis of the stored gyro log data 33.

When movement elements in the essentially fixed single direction are not included, the hand-shake correction processing section 43 performs the above-described hand-shake correction processing; namely, the correction processing for canceling all the computed amount of shifts.

In contrast, when the movement element in the essentially fixed single direction are included, the hand-shake correction processing section 43 computes the amount of shifts attributable to hand-shake, which has arisen in the records up to the specified record, through use of a value determined by subtracting the movement element in the specified direction from a difference between each record and the head record of the gyro log data 33, in place of the difference. Correction processing for correcting the frame image using the computed amount of shift is the same as mentioned previously, and its repeated explanation is omitted.

When hand-shake correction processing of the first frame image has been completed through use of the shifts, which are included in the records up to the specified first record and are attributable to hand-shake, the hand-shake correction processing section 43 again retrieves a record from the head of the gyro log data 33, to thus specify the second record where the VSYNC mark data assume a value of one. The hand-shake correction processing section 43 may perform retrieval operation as a follow-up to retrieval of the previous record during retrieval operation of the record. In FIG. 5, the nineteenth record from the top is specified as the second record. The hand-shake correction processing section 43 computes the amount of shifts in the records up to the second record, which are attributable to hand-shake, and performs hand-shake correction processing for the second frame image by means of the computed amount of shifts attributable to hand-shake.

As a result of repeating hand-shake correction processing for the respective frame images of the captured image data 32, the hand-shake correction processing section 43 subjects all frame images of the captured motion picture data 32 to hand-shake correction. When the motion pictures for six seconds correspond to the captured image data 32, the hand-shake correction processing section 43 performs hand-shake correction processing 90 times in relation to 90 frame images. The hand-shake correction section 43 generates the corrected motion picture data 34 from a plurality of the corrected frame images, and stores the thus-generated motion picture data into the storage device 13.

A threshold level for an amount of shifts is stored in the storage device 13 in advance. The amount of shifts being attributable to hand-shake which is included in each of the flame images is compared with the threshold level. In a case where the amount of shifts is no more than the threshold level, the hand-shake correction processing section 43 may not subject the flame image to processing for correcting the shifts. Whether correction processing is performed or not is selected with respect to each of the flame images, so that an amount of correction processing is diminished and workload for the hand-shake correction processing section 43 correction processing is reduced.

Next, a play mode will be described. When the play button of the key device 18 shown in FIG. 1 is actuated, the key device 18 outputs input data assigned to the play button. In accordance with a supply of input data, the mode switching section 41 sets the operation mode of the image capturing apparatus to the play mode. As shown in FIG. 4, the image capturing apparatus shown in FIG. 1 implements the play processing 44.

First, the play processing section 44 reads the first frame image data from the corrected motion picture data 34 stored in the storage device 13, and writes the thus-read frame image data into the VRAM 21.

The LCD controller 22 periodically reads display data from the VRAM 21. The LCD controller 22 generates a display signal appropriate to the read display data, and outputs the thus-generated display signal to the LCD 17. Thereby, the LCD 17 displays the frame image written into the VRAM 21 by the play processing section 44.

The play processing section 44 reads, on a per-frame basis, the frame image data that are next to the finally-read frame image data among the corrected motion picture data 34 stored in the storage device 13, and writes the thus-read frame image data into the VRAM 21.

Thereby, a plurality of pieces of frame image data of the corrected motion picture data 34 are sequentially written into the VRAM 21 on a per-frame basis. Consequently, the image appearing on the LCD 17 is updated on a per-frame basis, and motion pictures formed from a plurality of frame images of the corrected motion picture data 34 are displayed on the LCD 17.

As mentioned above, in the image capturing apparatus of the present embodiment, the frame image data, which are generated by the image capturing device 2 and written into the storage device 13, are subjected to hand-shake correction on the basis of the gyro data that have been acquired during a time period from generation timing of the VSYNC signal to generation timing of the next VSYNC signal, in accordance with a periodically-generated VSYNC signal. Consequently, hand-shake correction processing can be performed accurately.

In the image capturing apparatus of the present embodiment, the LCD controller 22 sequentially performs processing of the image capturing controller 5 writing the frame image data into the VRAM 21, processing of the saving section 42 reading the frame image data, and processing of displaying frame image data. In this case, a time, which lapses from when the saving section 42 has requested reading of frame image data until when the saving section 42 actually reads the data, cannot be said to be constant. Consequently, the saving section 42 cannot ascertain exact timing when the image of the frame image data was captured, on the basis of timing when frame image data are read.

However, in the present embodiment, the gyro data, which are stored in the image capturing device 2 and have been detected by the gyro sensors 3, 4, are associated with data pertaining to generation timing of the VSYNC signal, and the thus-associated data are stored in the storage device 13. On the basis of the movement data pertaining to a time period from generation timing of the VSYNC signal to the next generation timing, the stored data are used for subjecting the frame image data to hand-shake correction. Consequently, hand-shake correction processing can be performed accurately.

In the image capturing apparatus of the embodiment, the frame image data captured by the image capturing device 2 are stored in the storage device 13 in time sequence and in the order of acquisition. The gyro data and data pertaining to generation timing of the VSYNC signal are stored as gyro log data into the storage device 13 in time sequence and in the order of acquisition. Consequently, the hand-shake correction processing 43 associates, in stored sequence, the stored frame image data with the stored gyro log data, to thus appropriately cancel hand-shake.

In the image capturing apparatus of the present embodiment, the hand-shake correction processing section 43 performs hand-shake correction processing after having eliminated movement elements, which are included in a plurality of pieces of gyro data stored in the storage device 13 and are attributable to panning, through filtering operation. Consequently, shifts attributable to hand-shake can be appropriately eliminated from the motion picture captured through panning.

In the image capturing apparatus of the present embodiment, the saving section 42 starts accumulation of gyro data detected by the gyro sensors 3, 4 after lapse of a predetermined period of time; e.g., one second, since the gyro sensors 3, 4 were started. Consequently, the saving section 42 can accumulate the gyro data detected by the gyro sensors 3, 4 into the storage device 13 after the gyro data have gone through a transient state and become stable. Even when the image capturing apparatus has been temporarily moved abruptly by operation of the play start button 18b, hand-shake correction processing can be performed so as to eliminate the influence of abrupt movement. As a result of the first gyro data of the gyro log data 33 having become stable, hand-shake can be appropriately corrected while the time at which the first gyro data have become stable is taken as a criterion.

The above embodiment is an example of a preferred embodiment of the present invention. The present invention is not limited to this embodiment and is susceptible to various modifications or alterations within the scope of the invention.

For instance, in the embodiment, data pertaining to the frame image captured by the image capturing device 2 are written into the VRAM 21. Subsequently, the data are stored in the storage device by the saving section 42. In addition, data pertaining to the frame images captured by the image capturing device 2 may be written into memory other than the VRAM 21, such as buffer memory, and subsequently, the data may be stored in the storage device by the saving section 42.

In the above embodiment, the saving section 42 and the hand-shake correction processing section 43 are implemented in the image capturing mode. In the play mode, the play processing section 44 is implemented. Alternatively, the saving section 42, the hand-shake correction processing section 43, and the play processing section 44 may be implemented simultaneously. Even in this modification, the play processing section 44 may write the corrected frame image data into the VRAM 21. The image capturing controller 5 may write the frame image data captured by the image capturing device 2 into memory, such as a buffer, provided separately from the VRAM 21. Thereby, the motion pictures acquired after hand-shake correction processing are displayed on the LCD 17 in real time. Even in this modification, a conflict may arise between processing of the image capturing controller 5 writing the frame image data captured by the image capturing device 2 into memory and processing of the saving section 42 reading the frame image data from the memory. Therefore, a memory controller serving as means for controlling access to the memory is provided, so that the above-described processing operations are performed sequentially.

In the image capturing apparatus of the present invention, it is possible to store the captured motion picture data 32 and the gyro log data 33, which are stored in the storage device 13, into storage media, such as a disc, a tape or a semiconductor memory or the like, and to transfer the captured motion picture data 32 and the gyro log data 33 to an image correction apparatus, such as a personal computer or the like. In this case, correction processing may be performed in the image correction apparatus.

The present invention can be utilized for an image capturing apparatus which is carried or fixed on a moving body and captures a motion picture.

What is claimed is:

1. An image correction system comprising:
   an image capturer, operable to capture an object image and to generate image data based on the object image;
   a first storage, adapted to store the image data;
   a timing signal generator, operable to periodically generate timing signals, an image processor, operable to periodically store the image data into the first storage in accordance with each of the timing signals;

a detector, operable to periodically detect movement of the image capturer and to generate movement data based on the detected movement;

a second storage, adapted to periodically store the movement data in association with timing data based on each of the timing signals; and a correction processor operable to correct the image data corresponding to a first time period that is defined between a first one of the timing signals and a second one of the timing signals which is subsequent to the first one of the timing signals based on the movement data corresponding to a second time period that is defined between the first one of the timing signals and a third one of the timing signals which is followed by the first one of the timing signals.

2. The image correction system according to claim 1, wherein:

the movement data corresponding to the second time period indicates a shift amount included in the image data corresponding to the first time period, and in a case where the shift amount is no more than a predetermined amount, the image data corresponding to the first time period is not corrected.

3. The image correction system according to claim 1, further comprising:

a buffer memory, adapted to temporarily store the image data generated by the image capturer, wherein the image processor reads out the image data from the buffer memory and stores the image data into the first storage.

4. The image correction system according to claim 1, wherein:

the first storage stores the image data in time-series order, the second storage stores the movement data and the timing data in the time-series order, and the correction processor reads out the image data from the first storage and the movement data and the timing date from the second storage in the time-series order.

5. The image correction system according to claim 1, wherein:

the movement data corresponding to the second time period includes a movement element being attributable to panning, and the correction processor eliminates the movement element from the movement data corresponding to the second time period by filtering before correcting the image data corresponding to the first time period.

6. The image correction system according to claim 1, wherein the detector includes a sensor for detecting the movement of the image capturer and a sampling unit for periodically sampling a value of the movement detected by the sensor.

7. The image correction system according to claim 6, wherein the sensor includes a first gyro sensor detecting a first angular velocity of the image capturer around a first axis that is perpendicular to an optical axis of the image capturer and a second gyro sensor detecting a second angular velocity of the image capturer around a second axis that is perpendicular to the optical axis and the first axis.

8. A correcting method comprising:

capturing an object image by a image capturer;

generating image data based on the object image;

periodically generating timing signals;

storing the image data into a first storage in accordance with each of the timing signals;

periodically detecting movement of the image capturer;

generating movement data based on the detected movement;

periodically storing the movement data in association with timing data based on each of the timing signals; and correcting the image data corresponding to a first time period that is defined between a first one of the timing signals and a second one of the timing signals which is subsequent to the first one of the timing signals based on the movement data corresponding to a second time period that is defined between the first one of the timing signals and a third one of the timing signals which is followed by the first one of the timing signals.

* * * * *